INVENTOR:
JOHN K. MC CARRON
BY: Louis J. Bovasso

HIS ATTORNEY

# United States Patent Office 3,525,226
Patented Aug. 25, 1970

3,525,226
APPARATUS FOR INDICATING UNDERWATER PIPELINES
John K. McCarron, Houston, Tex., assignor to Shell Oil Company, New York, N.Y., a corporation of Delaware
Filed Dec. 16, 1968, Ser. No. 783,923
Int. Cl. F16l 1/00; B63c 25/00
U.S. Cl. 61—72.3                                                          12 Claims

ABSTRACT OF THE DISCLOSURE

Apparatus for indicating the free end of an underwater pipeline at the water surface by circulating a pig within a pipeline, the pig having a shaft slidably mounted therein and a floatable member releasably attached to the pig. Slip means carried by the pig is adapted to engage the inner wall of the pipeline. Slip actuating means is carried by the shaft and adapted to actuate the slip means when the shaft moves in the direction of movement of the pig within the pipeline. Biasing means cooperates with the shaft and biases the shaft in the direction of movement of the pig. Extensible trigger means is attached to the pig and is adapted to engage both the inner wall of the pipeline and the shaft to retain the shaft in a stationary position against the biasing means. Trigger actuating means cooperates with the trigger means for moving the trigger means out of the engagement with the shaft when the trigger means is free of the pipeline thus releasing the shaft which moves in the direction of movement of the pig and actuates the slip actuating means to set the slip means against the inner wall of the pipeline. Floatable member releasing means cooperates with both the shaft and the floatable member to release the floatable member when the shaft is released by said trigger means and an indicating line is attached to both the pig and the floatable member for indicating the underwater position of the free end of the pipeline at the water surface.

BACKGROUND OF THE INVENTION

Field of the invention

The present invention relates generally to underwater pipe laying and to the repair of underwater pipelines, and more specifically to a technique for indicating the underwater position of the end of a pipeline at the water surface so that the submerged end may be joined to a second pipeline end.

Description of the prior art

In laying pipeline underwater, in certain instances, joining of sections of pipe to form a pipeline is planned at the time the pipeline is originally constructed. Under these circumstances, a line and buoy or other devices for locating and attaching to the pipe end may be installed prior to lowering the pipeline. However, in other instances, joining is not anticipated. For example, it may be desired to repair broken or damaged portions of a pipeline, or install a new section of pipeline containing appurtenances such as valves, branch connections, and the like. It is difficult in these latter circumstances to place the pipe sections to be joined accurately. With the pipe sections slung from cranes or the like, the operation must either be carried out by divers, or remotely controlled from the surface, or the pipe sections can be preassembled on the surface and lowered into place. Numerous divers would be required to handle large pipes and would be working under difficult conditions, while remote control would be practical only in shallow water, all of these systems being adversely affected by rough water or currents. Preassembling pipe sections on the surface would simplify the proper sealing of the joints, but lowering the assembled pipes onto a possible uneven surface below water would, in most cases, break the joints and damage the pipes.

The discovery and recovery of offshore oil and gas deposits continues to be of increasing and vital interest. These activities have been in progress for many years, but primarily at relatively shallow depths. Deeper water operations have increased the need for reliable techniques for joining pipelines at depths of 1,000 feet and deeper.

Since many of the underwater locations are at depths at which divers cannot operate or at which it is uneconomical to utilize divers, relatively complicated remote control and surveillance systems would have to be designed in order to produce satisfactory results with the conventionally used welding techniques. Such complicated remote control and surveillance equipment is both expensive to build and to maintain. At this time, there is no present capability for making pipe joints at 1,000-foot or more depths.

One such method and associated apparatus for so joining pipelines underwater is disclosed in a copending application of common assignee Ser. No. 744,161, filed July 11, 1968 to Meister et al. In the Meister et al. application, it was found necessary to provide a guide to the submerged pipeline end so that the pipe joining apparatus may be guided into position with the submerged pipeline end. Such a guide would eliminate the necessity for manipulating the joining apparatus manually, such as through divers operating either in the sea environment or in a chamber, to bring the joining apparatus into position with the submerged end.

SUMMARY OF THE INVENTION

It is an object of this invention to provide apparatus for indicating the underwater position of the free end of a submerged pipeline at the water surface.

It is a further object of this invention to provide a means for guiding apparatus for joining pipelines underwater into position with the free end of a submerged pipeline.

These objects are carried out by circulating a pig in a pipeline, the pig having a slidably mounted shaft and a floatable member releasably attached to the pig. Slip means is carried by the pig and adapted to engage the inner wall of the pipeline. Slip actuating means is carried by the shaft and adapted to actuate the slip means when the shaft moves in the direction of movement of the pig within the pipeline. Biasing means cooperates with the shaft and biases the shaft in the direction of movement of the pig. Extensible trigger means is attached to the pig and is adapted to engage both the inner wall of the pipeline and the shaft to retain the shaft in a stationary position against the biasing means. Trigger actuating means cooperates with the trigger means for moving the trigger means out of engagement with the shaft when the trigger means is free of the pipeline thus releasing the shaft which moves in the direction of movement of the pig and actuates the slip actuating means to set the slip means against the inner wall of the pipeline. Floatable member releasing means cooperates with both the shaft and the floatable member to release the floatable member when the shaft is released by said trigger means and an indicating line is attached to both the pig and the floatable member for indicating the underwater position of the free end of the pipeline at the water surface.

DESCRIPTION OF THE PREFERRED EMBODIMENT

Figure 1:
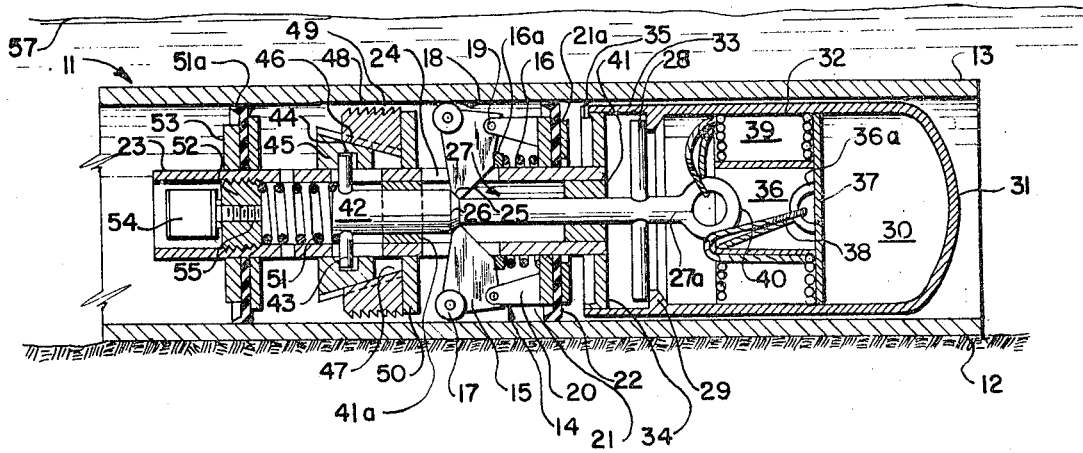
FIG. 1 is a vertical sectional view of a pipeline resting on the ocean bottom showing the apparatus for indicating the free end of the pipeline in an inoperative position.
Figure 2:
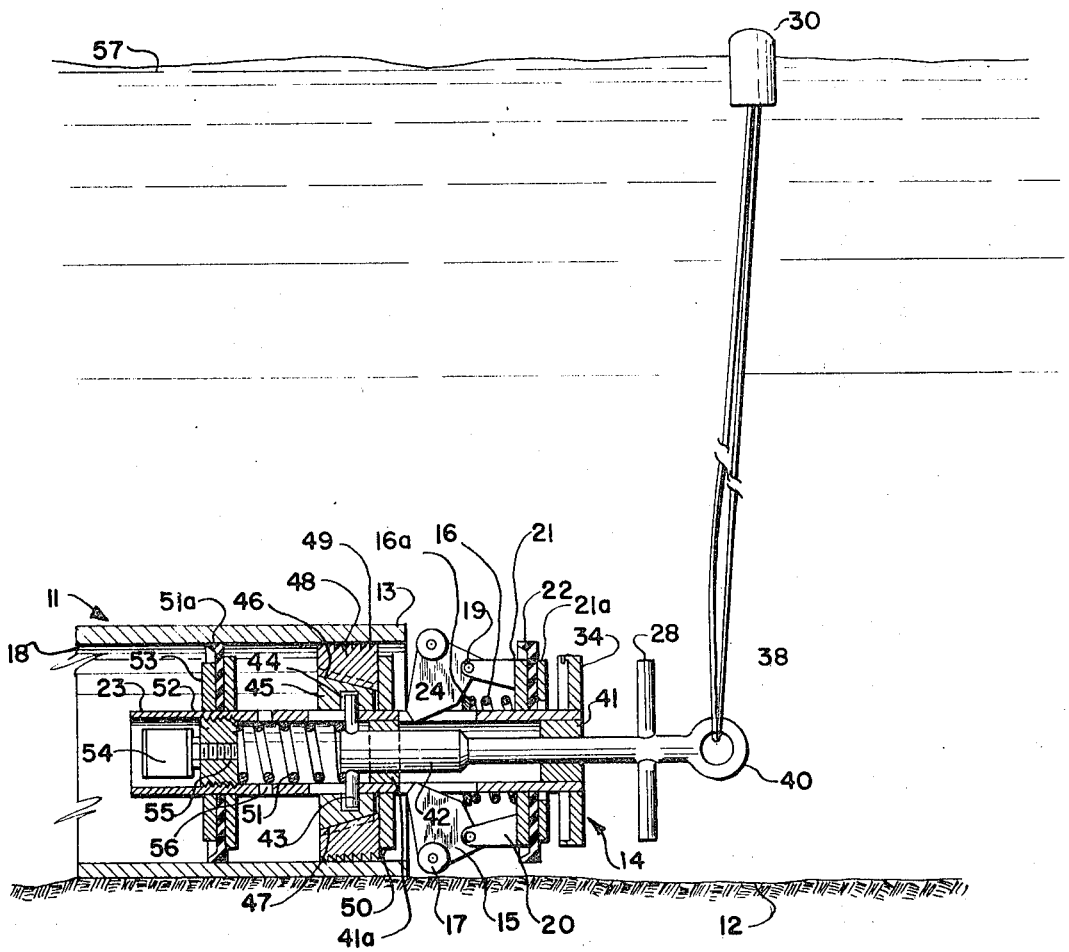
FIG. 2 is a vertical sectional view of the pipeline of FIG. 1 showing the underwater-indicating apparatus in operative position.

Referring to the drawing, FIG. 1 shows a portion of a pipeline 11 resting on the ocean bottom 12. The free end 13 thereof is adapted to be joined to the free end of a second pipeline (shown in FIG. 4) as is well known in the art and which will be explained further hereinbelow. A pipeline scraper or pig 14, which includes all of the equipment necessary to carry out the concepts of this invention, is shown in FIG. 1 in position at the free end 13 of pipeline 11. Such devices are well known in the art and are circulatable in a pipeline for various reasons, such as removing undesirable materials which collect in a pipeline. These pigs are circulated through a pipeline by pumping a fluid, such as water, behind the pig thus forcing it through the pipeline. Pig 14 is provided with one or more extensible fingers or trigger plates 15, shown in an inoperative position of compression in FIG. 1, for stopping the pig 14 at the end 13 of pipeline 11. Plates 15 are preferably biased in a direction outwardly of the central axis of pig 14 by means of trigger springs 16 fixed at one end to a sliding collar 16a and at the other end to bracket plate 21. However, as an alternate configuration to be discussed further hereinbelow, plates 15 may be actuated merely by the action of the sliding of the pig 14 out of the pipeline 11. Collar 16a abuts against the rear of plate 15 and slides on cylinder 23 as seen in FIGS. 1 and 2. Preferably, three or more such trigger plates 15 are provided. Plates 15 include, at their outer extremities, rollers 17 which abut against the inner surface 18 of pipeline 11. Plates 15 pivot about a pivot point 19 on a bracket 20 fixed to the bracket plate 21. A resilient scraper disk 22 preferably extending circumferentially within inner surface 18 is mounted on the inner cylinder 23 which forms the main body portion of pig 14. Disk 22 is preferably disposed between plates 21 and 21a seen in FIGS. 1 and 2. Of course, the body portion of pig 14 may take various configurations, if desired.

Cylinder 23 extends axially of pipeline 11 and includes a slotted portion or portions 24 into which extend an abutting lip portion 25 on plate 15 as can best be seen in FIG. 1. Lip portion 25 abuts against a shoulder 26 formed on a shaft 27 which extends axially of cylinder 23. Shaft 27 includes a reduced portion 27a at its forward end carrying a rod or plate 28 which abuts against a lip portion 29 at the rear of a buoy 30 which is freely slidable in pipeline 11. Buoy 30 is formed of buoyant material and includes a head portion 31 extending in a direction outwardly of end 13 and a rear portion 32 including the aforementioned lip portion 29 and an extension portion 33 adapted to engage the L-portion of an L-shaped bracket 34 threaded onto the extreme end of cylinder 23. One or more shear pins 35 extends through both extension portion 33 and bracket 34 for reasons to be discussed further hereinbelow.

Buoy 30 includes, in its rear portion 32, an open-ended cavity 36 having a ring 37 mounted on its inner wall 36a with one end of a continuous loop messenger line 38, such as nylon, fastened thereto. Surplus line 38 is contained in a compartment 39 extending circumferentially of and forming the rear portion 32 of buoy 30. The other end of line 38 is fastened to a ring portion 40 forming the forward end of reduced portion 27a of shaft 27 and extending into the open end of cavity 36. A plurality of spacer elements 41 fastened to the inner surface of cylinder 23 retain shaft 27 in a spaced position from cylinder 23 so that the ring portion 40 and plate 28 is properly aligned with buoy 30.

The larger rear portion 42 of shaft 27 carries a rod or pin 43 fixed thereto and adapted to fit in a hole or cavity 44 formed in a brake or slip actuator 45. Actuator 45 includes an upper tapered portion containing two or more male dovetail slides 46 adapted to mate with like female dovetail grooves 47, one of which is cut in the tapered portion formed on the underside of each of the two or more brakes or slips 48. Slips 48 include a plurality of slip fingers or teeth 49 angled in the direction of travel of pig 14 in pipeline 11 as is well known in the art. Preferably, there are two or more slips 48 each of which is slidably attached by means of dovetail slides to the slip actuator 45, and also to abutment member 50. This ensures that slips 48 are held in a collapsed, or inoperative position until the device is actuated through extension of trigger plates 15. An abutment member 50 is fixed to cylinder 23 and adapted to stop the rearward motion of slips 48 as slip actuator 45 pushes slips 48 into engagement with surface 18 of pipeline 11 as will be explained further hereinbelow. As can be seen in FIG. 1, the slip actuator 45 and slips 48 are in the inoperative or "collapsed" position.

A brake or slip actuating spring 51 is fixed at one end to an abutment member 52 screw-threaded or otherwise fixed to the inner wall of cylinder 23 and at its other end to rod or pin 43 on shaft 27. Obviously, hydraulic or other actuating means may be substituted for spring 51, if desired. Additional scraper disks 51a, similar to disk 22, may be fixed to cylinder 23 in a variety of ways, if desired, such as being bolted between a pair of brackets 53 integral with or otherwise mounted on cylinder 23 as seen in FIGS. 1 and 2.

A conventional spring-biased relief valve 54 is preferably mounted in the rear end of cylinder 23 so as to permit the fluid used to pump pig 14 through pipeline 11 to bypass the pig 14 after the slips 48 are set. Valve 54 is threaded in an opening 55 formed in abutment member 52. A hole or opening 55 communicates with the interior portion of cylinder 23 occupied by spring 51. A hole or holes 56 permits pumping fluid to pass from hole 55 through cylinder 23, and thence between slips 48 to pipe end 13. In this manner, the fluid used to pump pig 14 through pipeline 11 opens relief valve 54 when slips 48 are set, and bypasses pig 14 through openings 55 and 56 and out of the pipeline 11.

In operation, pig 14 is pumped through pipeline 11 by means of a pumping fluid, such as air or water. When trigger plates 15 pass out of the end 14 of pipeline 11, they extend outwardly from cylinder 23 under the compression of spring 16 as can be seen in FIG. 2. This is the preferred configuration. Alternatively, the lip portion 25 and shoulder 26 can be fixed at such an angle with respect to a line from lip portion 25 to pivot 19 so that spring 51 will actuate the trigger plates 15 without the use of spring 16.

This releases lip portion 25 from shoulder 26 and, with the aid of spring 51, urges shaft 27 forwardly thus pushing lip portion 29 and shearing pins 35 thereby releasing buoy 30. Buoy 30, attached to line 38, lets out line 38 and floats to the water surface 57 thus indicating the underwater position of the free end 13 of pipeline 11. At this time, the pumping of fluid into pipeline 11 may be stopped, the relief valves 54 compensating for any over-pumping of fluid.

Simultaneously with the forward movement of shaft 27, pin 43 moves the tapered portion 46 of slip actuator 45 against the tapered portion 47 of slips 48. This movement pushes slips 48 up and into engagement with the inner surface 18 of pipeline 11 as can be seen in FIG. 2. The teeth 49 on slips 48 engage the inner surface 18 and retain pig 14 in a fixed position at the free end 13 of pipeline 11.

One example of the practical use of the method of this invention will now be discussed.

Figure 3:
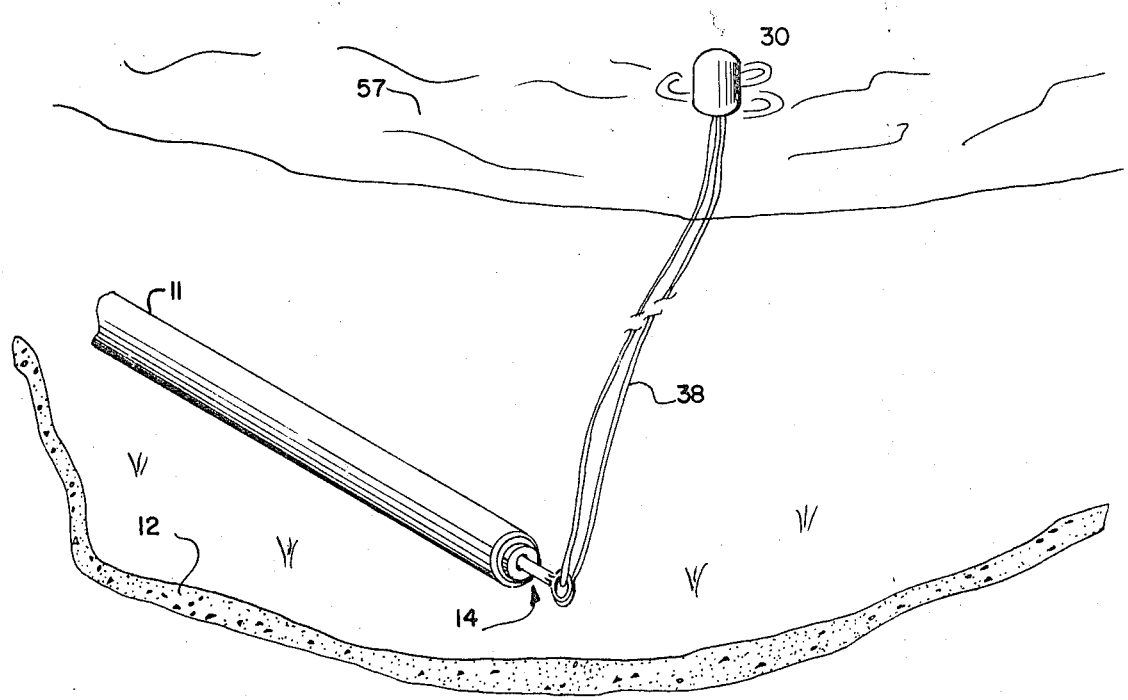
FIG. 3 is an isometric perspective view of the final position of the underwater-indicating apparatus of FIGS. 1 and 2.

Referring to the drawing, FIG. 3 shows the above method buoying off pipeline 11 for subsequent joining to a second pipeline. A variety of methods can be used to bring the pipelines into adjacent relationship. One such method is disclosed in a copending application of common assignee Ser. No. 738,531, filed June 20, 1968, to Hammett. In this application, the underwater position of a first pipeline is marked visible from the surface. A second pipeline is drawn into position close to the marker for the first pipeline. The free end of the second pipeline is prepared for joining to the first pipeline, if required, and manipulating and joining apparatus is attached to the free end of the second pipeline. Using a continuous loop, guide line 38 from the first pipeline 11, the second pipeline, together with the manipulating and joining apparatus, is lowered in to overlapping position with respect to the first pipeline 11. Alternatively, guide line 38 may be used as a messenger line to pull a stronger line, or a series of successively stronger lines through ring portion 40 on pig 14.

Figure 4:
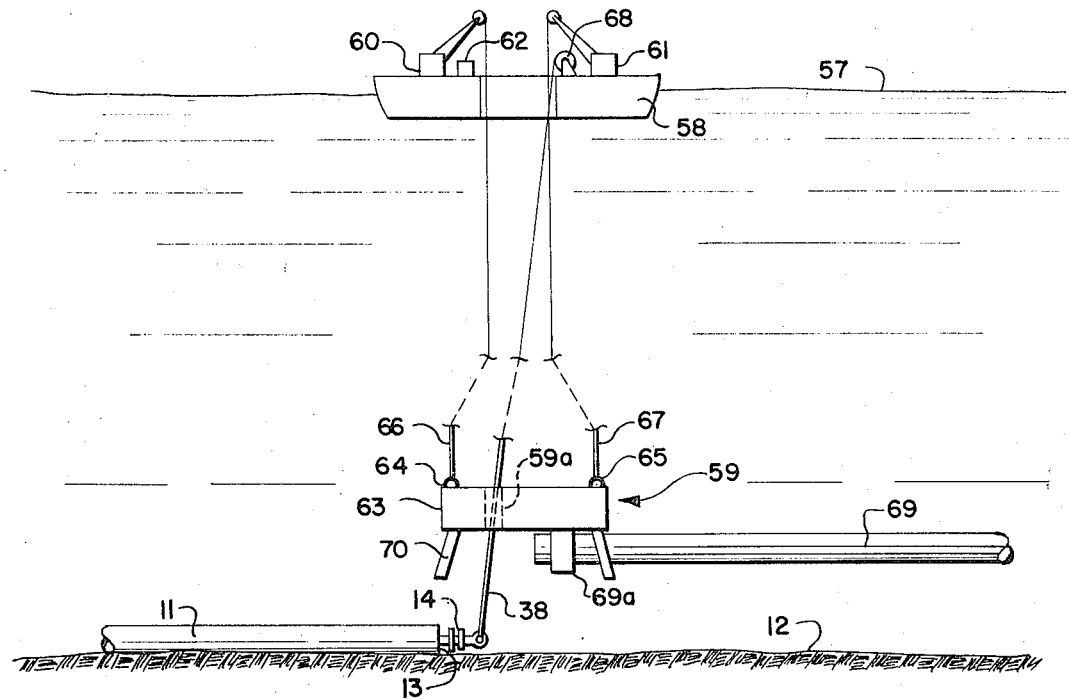
FIG. 4 is a diagrammatic view illustrating pipe-engaging apparatus being lowered through a body of water together with an end of a pipeline guided by the apparatus of this invention.

Although various homing or ranging systems may be utilized to guide the manipulating apparatus and the attached pre-prepared pipe end from a point on the sea surface to a point below on the sea floor, FIGS. 3 and 4 illustrate one method for utilizing the concepts of this invention for joining pipelines underwater.

As shown in FIG. 3, and discussed hereinabove, a pig 14 is pumped along the submerged pipeline 11 which may, for example, extend from shore. The pipeline 11 rests on the sea bottom 12 and pig 14, adapted to stop at the end of pipeline 11 by the means disclosed hereinabove, releases line 38 having buoy 30 attached thereto. The line 38 is then picked up by a pipe lay barge 58 (FIG. 4) and tensioned, as, for example, by a block and counterweight or submerged buoy, to provide straight-line guide to the submerged pipeline end. Using the method suggested in application No. 738,531 to lay the pipelines would eliminate the necessity for further marking the pipeline 11 extending from the wellhead.

The manipulating and aligning apparatus 59 (FIG. 4) comprises a conventional cooperating guide mechanism 59a for engaging the guide wire 38 during the lowering of the manipulating apparatus 59 to the ocean floor. For example, winches 60 and 61, on lay barge 58, are adapted to carry the new pipe end into contact with the submerged end 13 in the manner suggested in application Ser. No. 738,531. Winches 60 and 61 are remotely actuated by suitable control equipment 62 on barge 58 as is well known in the art.

As illustrated in FIG. 4, the manipulating apparatus 59 comprises a rectangular frame 63 having a pair of plates 64 and 65 integrally formed or otherwise attached to frame 63. Guide or lowering cables 66 and 67 pass through holes in plates 64 and 65, respectively, and are suitably fastened to plates 64 and 65. Guide cables 66 and 67 operatively engage winches 60 and 61, respectively, on barge 58 for raising and lowering apparatus 59. Cables 66 and 67, or at least one of the guide cables 66 and 67, may be a weight supporting and power transmitting cable for supplying power to the various components of apparatus 59.

As seen in FIG. 4, the line wire or wires 38 coupled to submerged pipeline 11 is preferably released from buoy 30 and the free end thereof is passed through the guide element 59a of the manipulating apparatus 59 at the barge 58.

The line wire 38 is then tensioned, as, for example, by winch 68, and the manipulating apparatus 59, having new pipeline 69 attached thereto by means of clamp 69a, is lowered by winches 60 and 61 on barge 58 into contact with pipeline 11.

The actual method of joining pipelines 11 and 69 forms no part of this invention and is adequately described in application Ser. No. 744,161, filed July 11, 1968, to Meister et al.

Thus, it can be seen from the foregoing that pig 14 in pipeline 11 enables manipulating apparatus 59 to be readily lowered into position for joining a pair of pipelines underwater. The underwater position of the free end 13 of pipeline 11 is readily visible at the water surface and the messenger line 38 to buoy 30 is used to guide apparatus 59 into place. The pipeline 69, adapted to be joined to pipeline 11, is loaded on apparatus 59 prior to being lowered to the sea bottom 12 by means of winches 60 and 61 and guide cables 66 and 67. At the same time line 38, attached to pig 14 within pipeline 11, is drawn through apparatus 59 so as to substantially align the free ends of pipelines 11 and 69. Legs 70 on apparatus 59 permit the apparatus to rest on the ocean bottom 12 as discussed in detail in the aforementioned Meister et al. application.

The invention may be used in conjunction with other in-line devices well-known in the art such as pigs which detect leaks, pigs which contain explosive devices to sever the line at some predetermined time, location, pressure, distance, and/or at some signal transmitted through the pipeline or through the water.

Trigger plates 14 are so arranged that the device cannot be actuated unless all of the plates 15 are released. Thus, the device is adapted to traverse branch connections and other appurtenances in which one or more, but not all of the trigger plates 15 are free to extend. Further, any tension applied to shaft 27 through ring portion 40 tends to lock slips 48 through the action of pin 43 of slip actuator 45. Thus, the gripping action of the slips is considerably greater than that which is achieved by spring action alone.

It is understood that minor variations from the embodiment of the invention disclosed herein may be made without departure from the spirit and scope of the invention and that the specification and drawings are to be considered as merely illustrative rather than limiting.

I claim as my invention:

1. Apparatus for indicating the free end of an underwater pipeline at the water surface comprising:

a pig adapted to be circulated within said pipeline;

said pig having a central body member adapted to extend axially within said pipeline;

a shaft slidably mounted within said body member;

a floatable member releasably attached to said shaft;

slip means carried by said pig and adapted to engage the inner wall of said pipeline;

slip actuating means carried by said shaft and adapted to actuate said slip means when said shaft moves in the direction of movement of said pig within said pipeline;

biasing means cooperating with said shaft and adapted to bias said shaft in the direction of movement of said pig within said pipeline;

extensible trigger means attached to said pig and adapted to engage both the inner wall of said pipeline and said shaft thereby retaining said shaft in a stationary position against the bias of said biasing means;

trigger actuating means cooperating with said trigger means for moving said trigger means out of engagement with said shaft when said trigger means is free of said pipeline thereby releasing said shaft so that it moves in the direction of movement of said pig and actuates said slip actuating means to set said slip means against the inner wall of said pipeline;

floatable member releasing means cooperating with both said shaft and said floatable member and adapted to release said floatable member when said shaft is released by said trigger means; and an indicating line cooperating with both said floatable member and said pig for indicating the underwater position of the free end of said pipeline at the water surface.

2. The apparatus of claim 1 wherein the trigger means includes a spring-biased pivotable trigger plate having a roller disposed at the junction of the trigger plate with the inner wall of the pipeline;

said spring biasing said trigger plate outwardly from said body member; and said plate being pivotable from a position in engagement with both the shaft and the inner wall of the pipeline to a position away from the shaft when said plate is free of said pipeline.

3. The apparatus of claim 2 including slotted means disposed in said body member; and said trigger plate includes a lip portion adapted to extend through said slotted means and into engagement with said shaft when said trigger plate is in engagement with the inner wall of said pipeline.

4. The apparatus of claim 3 wherein said shaft includes a reduced portion forming a shoulder thereon; and said lip portion of said trigger plate engages said shoulder when said trigger plate is in engagement with the inner wall of said pipeline thereby retaining said shaft in a stationary position against the bias of said biasing means.

5. The apparatus of claim 1 including resilient scraper means mounted on said body member and adapted to engage the inner surface of said pipeline.

6. The apparatus of claim 1 wherein said floatable member is a buoy having a buoyant head portion and a rear portion;

abutting means on the rear portion of said floatable member operatively engaging said shaft when said shaft is stationary within said body member; and shearing means cooperating with both said floatable member and said body member adapted to be sheared when said shaft is moved in the direction of movement of the pig within said pipeline.

7. The apparatus of claim 6 wherein said indicating line is a continuous loop line attached to both the shaft and the floatable member; and said floatable member includes a cavity opening rearwardly of said floatable member and retaining therein the forward portion of said shaft when said shaft is stationary within said body member.

8. The apparatus of claim 1 where said actuating slip means includes a cavity opening towards said body member and an upper surface tapered downwardly in the direction of movement of said pig within said pipeline;

pin means connected to said shaft adapted to fit in the cavity of said slip actuating means;

said slip means comprising a plurality of resilient teeth adapted to grip the inner surface of said pipeline when brought into engagement therewith;

said slip means having a lower surface tapered at the same angle as the upper surface of said slip actuating means; and the upper tapered surface of said slip actuating means being adapted to slide under the lower tapered surface of said slip means when said shaft is released under the forward thrust of said biasing means thereby moving said slip means away from said shaft and into gripping engagement with the inner surface of said pipeline.

9. The apparatus of claim 1 including relief valve means operatively engaging said body member adapted to permit any fluid pumped through said body member after said slip means grips the inner wall of said pipeline to bypass said body member and exit out of the free end of said pipeline.

10. The apparatus of claim 9 wherein said relief valve means includes a spring biased relief valve mounted in said body member; and passageway means cooperating with said body member and said shaft to permit circulating fluid to bypass said pig and exit out of the free end of said pipeline.

11. The apparatus of claim 1 wherein said trigger means are so arranged in said pig that said shaft is released only by the actuation of all of said trigger means.

12. The apparatus of claim 1 wherein said biasing means is adapted to increase the setting of said slip means against the inner wall of said pipeline when tension is applied to the forward end of said shaft.

References Cited

UNITED STATES PATENTS

| | | | |
|---|---|---|---|
| 1,874,081 | 8/1932 | Burrows | 61—72.3 |
| 2,156,651 | 5/1939 | Gardiner | 61—72.3 X |
| 2,807,937 | 10/1957 | Rhodes | 61—72.3 |

JACOB SHAPIRO, Primary Examiner

U.S. Cl. X.R.

29—272